Nov. 3, 1931.  H. M. ROCKWELL  1,830,483
INTERNAL COMBUSTION ENGINE
Original Filed Nov. 23, 1925
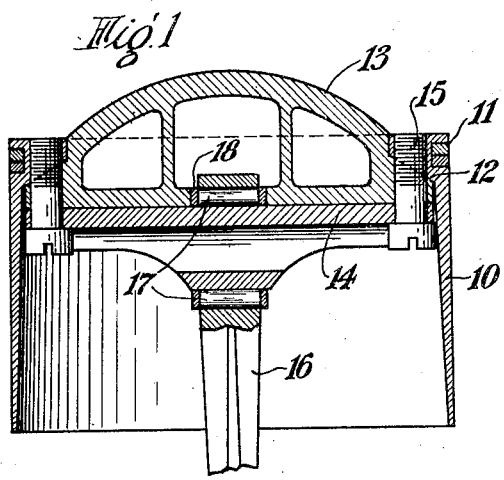
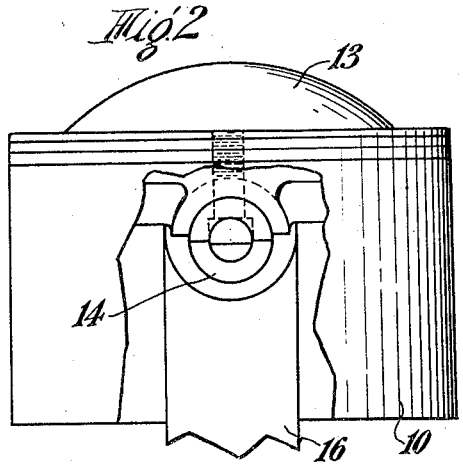
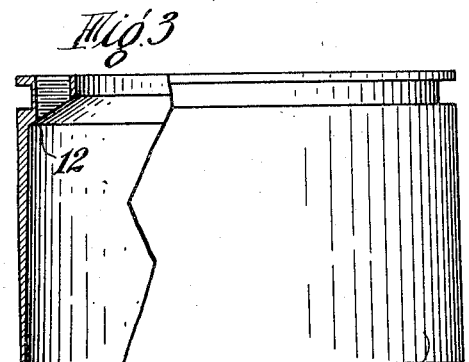
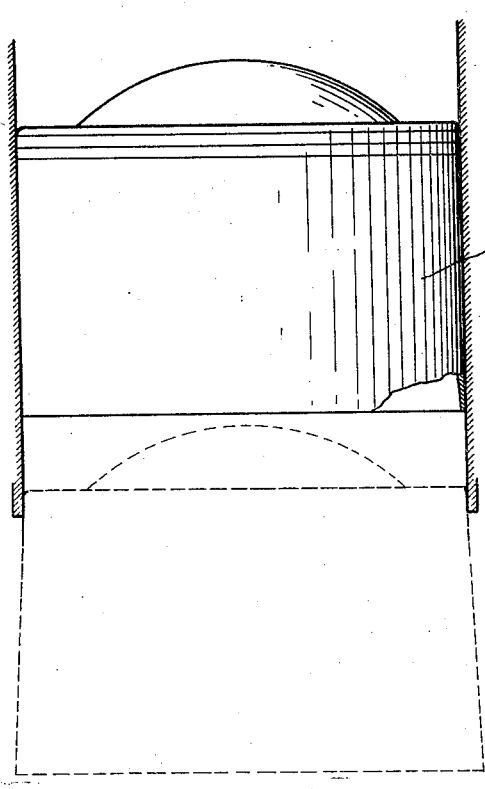
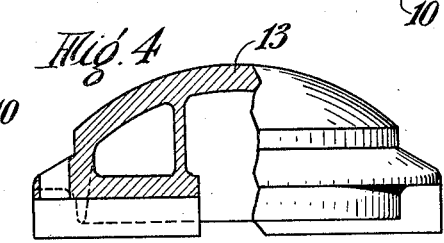
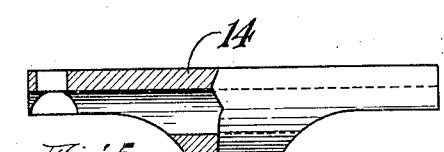
INVENTOR
HUGH M. ROCKWELL.
BY
Lewis O. Hutchinson
ATTORNEY

UNITED STATES PATENT OFFICE

HUGH M. ROCKWELL, OF FREEPORT, NEW YORK

INTERNAL COMBUSTION ENGINE

Refiled for abandoned application Serial No. 71,011, filed November 23, 1925. This application filed May 31, 1930. Serial No. 458,756.

This application is refiled for my abandoned application Serial No. 71,011, filed Nov. 23, 1925, and the invention relates to internal combustion engines and has for an object a light weight, inexpensive and highly efficient piston for such engines.

This object is obtained by forming the skirt of the piston of some wear resisting metal and the head of some light weight metal which are suitably joined together and supporting from the head a wrist pin upon which a connecting rod is journalled. The wrist pin has a cylindrical bearing portion from which it tapers into semi-circular portions through which pass fastening means. The weight of the usual bosses and full pin ends is thus eliminated. In addition, the lower edge of the piston wall is tapered and may be so constructed that its largest outer diameter is somewhat larger than that of the cylinder in which it is to operate so that when placed in the cylinder it is forced inward under pressure against the cylinder wall thereby lessening the necessity of using a number of piston rings. Referring now to the drawings:

Fig. 1 is a section through a piston embodying the invention.

Fig. 2 is an elevation thereof partly broken away.

Fig. 3 is a detailed view of the skirt of the piston.

Fig. 4 is a detailed view of the head.

Fig. 5 is a detailed view of the journal member, and

Fig. 6 illustrates the position of the piston within the cylinder.

The skirt 10 of the piston is constructed of cast iron or other suitable wear resisting metal and is provided near the top with a groove 11 to receive piston rings. The upper end of the skirt is open but is of less diameter than the interior of the main portion thereof so that there is formed a shoulder 12 having an oblique under surface. A head 13 of some light material such as aluminum, closes the upper end of the skirt and has an oblique annular surface co-acting with the lower surface of the shoulder 12 forming a tight joint. A bearing member 14 contacts with the lower surface of the head 13 and is held in position by bolts 15 which pass through the periphery of the head 13 and screw into the shoulder 12 thereby uniting the various elements together. The bearing member 14 is of a length substantially equal to the diameter of the head and is cylindrical at its mid-portion to form a bearing surface tapering away toward its ends into a semi-circular cross-section. This bearing is seated in a semi-circular groove in the head 13 and is grooved throughout its length to reduce its weight. It is preferably constructed of high carbon chrome steel so that its mid-portion may be ground to act as the inner race of an anti-friction bearing the other race of which comprises the inner surface of an aperture formed in the connecting rod 16. The lower face of the head 13 is cut away to receive the end of the connecting rod 16. Anti-friction rollers 17 complete the bearing connection between the connecting rod and the piston and are prevented from axial movement by means of cages 18 engaging them at either end and in turn engaging a portion of the head 13. The exterior diameter of these cages is less than the interior diameter of the bearing surface of the connecting rod so that the latter may move freely axially of the rollers.

The lower edge of the skirt 10 is preferably flared outwardly so as to give it a periphery at least as great as the interior circumference of the cylinder in which it is to be mounted. Thus, when the piston is placed within the cylinder the lower edge is thrust against the wall of the cylinder under considerable pressure thereby establishing a gas tight seal with the film of oil in the cylinder. The pressure, however, is not great enough frictionally to hold the piston in place but merely to obviate the need of lower piston rings.

The weight of the piston is reduced to a minimum as the usual bosses and wrist pin are supplanted by the light weight wrist pin 14 and the usual heavy head is replaced by the light weight head 13.

It is of course understood that various changes may be made in the structural details of this device without in any way departing from the spirit of the invention as set forth in the appended claims.

I claim:

1. A piston comprising a skirt of wear resisting metal having an inwardly projecting annular shoulder at one end, a head of light metal having a portion engaging said shoulder, a wrist pin contacting with said head, and means for joining together said wrist pin, head and piston.

2. A piston having a skirt of wear resisting material and having an inwardly projecting annular shoulder at one end, a light weight head having a portion contacting with said shoulder, a wrist pin seated in a groove in said head, a bearing surface on said wrist pin, and means for joining together said wrist pin, head and skirt.

3. A piston comprising a skirt of wear resisting material, a light weight head closing one end of said skirt, a wrist pin, means for connecting together said skirt, head and wrist pin, a connecting rod having an aperture through which passes said wrist pin, anti-friction members interposed between the surface of said aperture and the surface of said wrist pin, and means for preventing axial movement of said anti-friction members while permitting axial movement of said connecting rod.

4. A piston comprising a skirt of wear resisting material, a light weight head closing one end of said skirt, a wrist pin, means for connecting together said skirt, head and wrist pin, a connecting rod having an aperture through which passes said wrist pin, anti-friction members interposed between the surface of said aperture and the surface of said wrist pin, and cages to position said anti-friction members, said cages being of less diameter than the bore of the aperture in said connecting rod.

5. A piston comprising a head and skirt, said head having a groove, a wrist pin located in said groove, said wrist pin being tubular in its mid-portion and semi-annular at its end portions, a connecting rod and a journal connection between said connecting rod and said tubular portion of the wrist pin.

In testimony whereof, I have signed my name to this specification.

HUGH M. ROCKWELL.